United States Patent [19]
Williamson et al.

[11] Patent Number: 5,953,320
[45] Date of Patent: Sep. 14, 1999

[54] METHOD AND APPARATUS FOR CONSTRUCTING A TEMPORARY LIST OF NEIGHBORING BASE STATIONS IN A WIRELESS COMMUNICATION DEVICE

[75] Inventors: Paul T. Williamson; Don N. Andrus, both of San Diego; Jan C. Ault, Santee; Scott M. Owen, Cardiff, all of Calif.

[73] Assignee: QUALCOMM Incorporated, San Diego, Calif.

[21] Appl. No.: 08/908,865

[22] Filed: Aug. 8, 1997

[51] Int. Cl.[6] .................................... H04J 13/02
[52] U.S. Cl. ............................ 370/252; 370/331
[58] Field of Search ................... 370/252, 331, 370/332, 333, 335, 479; 455/436, 437, 438, 440; 375/200

[56] References Cited

U.S. PATENT DOCUMENTS

| | | | |
|---|---|---|---|
| 4,398,063 | 8/1983 | Hass et al. | 179/2 EB |
| 4,475,010 | 10/1984 | Huench et al. | 179/2 EB |
| 4,608,711 | 8/1986 | Goldman | 455/33 |
| 4,718,081 | 1/1988 | Brenig | 379/60 |
| 4,765,753 | 8/1988 | Schmidt | 379/60 |
| 5,054,110 | 10/1991 | Comroe et al. | 455/33 |
| 5,056,109 | 10/1991 | Gilhousen et al. | 375/1 |
| 5,101,501 | 3/1992 | Gilhousen et al. | 455/33 |
| 5,109,528 | 4/1992 | Uddenfeldt | 455/33.2 |
| 5,127,100 | 6/1992 | D'Amico et al. | 455/33.1 |
| 5,164,958 | 11/1992 | Omura | 375/1 |
| 5,179,571 | 1/1993 | Schilling | 375/1 |
| 5,267,261 | 11/1993 | Blakeney, II et al. | 375/1 |
| 5,327,577 | 7/1994 | Uddenfeldt | 455/33.2 |
| 5,432,843 | 7/1995 | Bonta | 455/438 |
| 5,577,022 | 11/1996 | Padovani et al. | 370/332 |
| 5,768,380 | 6/1998 | Rosauer et al. | 370/252 |
| 5,854,981 | 12/1998 | Wallstedt et al. | 455/439 |

FOREIGN PATENT DOCUMENTS 0421535  10/1990  European Pat. Off. ......... H04Q 7/04

OTHER PUBLICATIONS

TIA/EIA/IS–95–A; Mobile Station–Base Station Compatibility Standard for Dual–Mode Wideband Spread Spectrum Cellular System, pp. 7–75 –7–79, 7–183 –7–184, 7–114 – 7–115.

ANSI–J–STD–008 "Personal Station–Base Station Compatibility Requirements for 1.8 to 2.0 GHz Code Division Multiple Access Personal Communications Systems"; Aug. 8, 1995. pp. 2–223 –2–236, 3–164 –2–236.

*Primary Examiner*—Chau Nguyen
*Assistant Examiner*—Ken Vanderpuye
*Attorney, Agent, or Firm*—Russell B. Miller; Charles D. Brown; Roger W. Martin

[57] ABSTRACT

The wireless communication device receives a neighbor list message from a first base station. The neighbor list message includes a respective base station configuration parameter for each of a plurality of base stations. In response to the neighbor list message, the wireless communication device constructs a neighbor list table, including one record for each of the plurality of base stations, with each record including their respective base station configuration parameter. After handing off to a second base station, the wireless communication device replaces the record for the second base station with a corresponding record for the first base station. The wireless communication device then may change the respective base station configuration parameter for at least one of the records of the plurality of base stations in the neighbor list table to match the base station configuration parameter of the second base station.

8 Claims, 3 Drawing Sheets

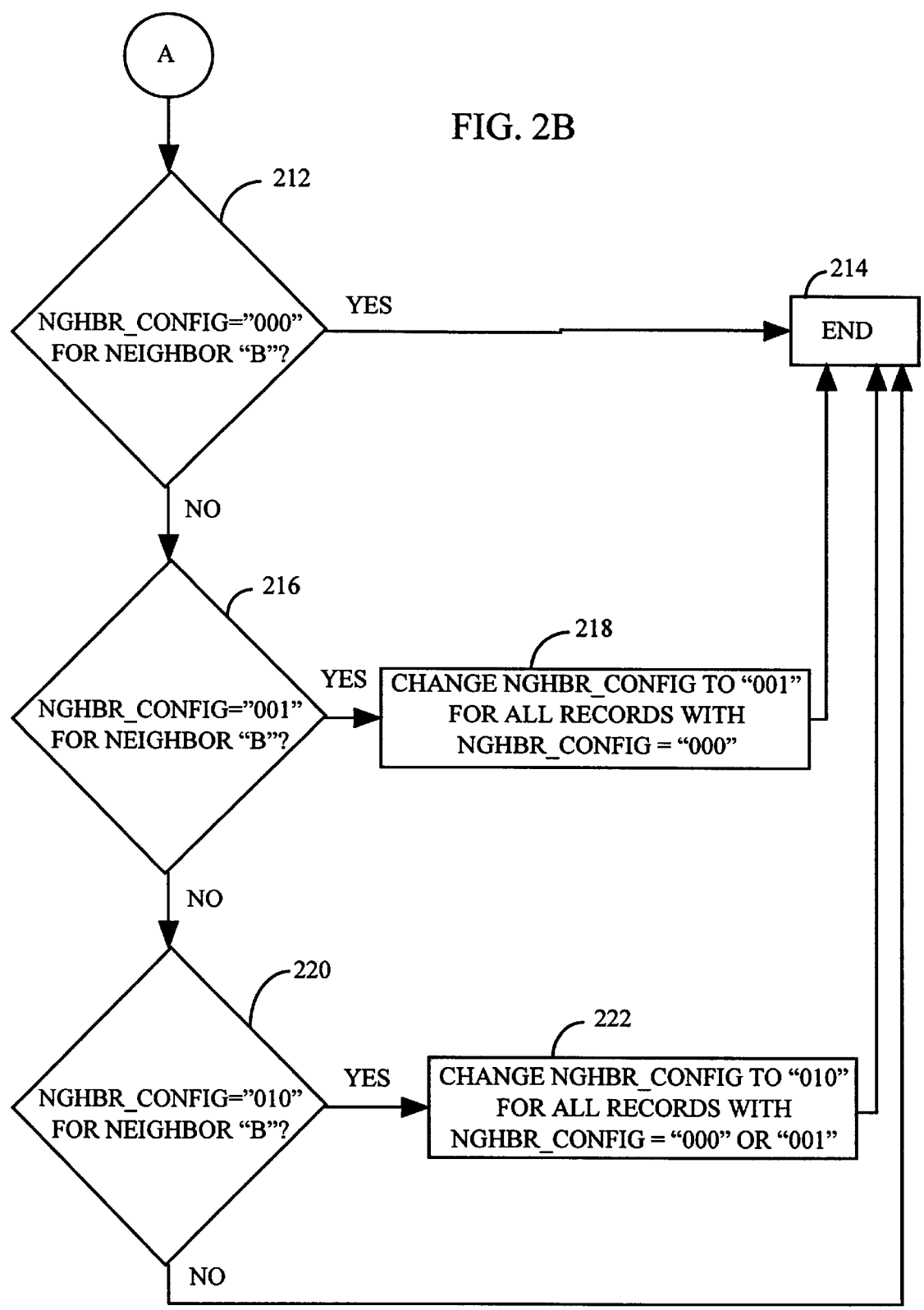

METHOD AND APPARATUS FOR CONSTRUCTING A TEMPORARY LIST OF NEIGHBORING BASE STATIONS IN A WIRELESS COMMUNICATION DEVICE

BACKGROUND OF THE INVENTION

I. Field of the Invention

The present invention relates to digital wireless communication systems. More particularly, the present invention relates to a novel and improved method and apparatus for constructing a temporary list of neighboring base stations in a wireless communication device.

II. Description of the Related Art

In the field of wireless communications, several technology-based standards exist for controlling communications between a mobile station, such as a cellular telephone, Personal Communication System (PCS) handset, or other remote subscriber communication device, and a wireless base station. These include both digital-based and analog-based standards. For example, among the digital-based cellular standards are the Telecommunications Industry Association/Electronic Industries Association (TIA/EIA) Interim Standard IS-95 series including IS-95A and IS-95B, entitled "Mobile Station—Base Station Compatibility Standard for Dual-Mode Wideband Spread Spectrum Cellular System." Similarly, among the digital-based PCS standards are the American National Standards Institute (ANSI) J-STD-008 series, entitled "Personal Station—Base Station Compatibility Requirements for 1.8 to 2.0 GHz Code Division Multiple Access (CDMA) Personal Communication Systems." Other non-CDMA based digital standards include the time-division multiple access (TDMA) based Global System for Mobile Communications (GSM), and the U.S. TDMA standard TIA/EIA IS-54 series.

The spread spectrum modulation technique of CDMA has significant advantages over other modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein.

Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention and incorporated by reference herein.

The deleterious effects of fading can be further controlled to a certain extent in a CDMA system by controlling transmitter power. A system for cell-site and mobile unit power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM", Ser. No. 07/433,031 now U.S. Pat. No. 5,056,109, filed Nov. 7, 1989, also assigned to the assignee of the present invention. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

The aforementioned patents all describe the use of a pilot signal used for acquisition in a CDMA wireless communication system. At various times when a wireless communication device such as a cellular or PCS telephone is energized, it undertakes an acquisition procedure which includes, among other things, searching for and acquiring the pilot channel signal from a base station in the wireless communication system. For example, demodulation and acquisition of a pilot channel in a CDMA system is described in more detail in copending U.S. patent application Ser. No. 08/509,721 now U.S. Pat. No. 5,805,648, entitled "METHOD AND APPARATUS FOR PERFORMING SEARCH ACQUISITION IN A CDMA COMMUNICATION SYSTEM," assigned to the assignee of the present invention and incorporated herein by reference. When more than one pilot channel can be acquired by the wireless communication device, it selects the pilot channel with the strongest signal. Upon acquisition of the pilot channel, the wireless communication device is rendered capable of acquiring additional channels from the base station that are required for communication. The structure and function of these other channels is described in more detail in the above referenced U.S. Pat. No. 5,103,459 and will not be discussed in detail herein.

Once the wireless communication device has acquired the pilot channel, it may also start demodulating the sync channel. The sync channel carries cell site identification, the cell site pilot PN carrier offset, the paging channel data rate, and system time. With this information, the wireless communication device is capable of demodulating the paging channel. The paging channel is used for transmission of control information and pages from a base station to the wireless communication device. One of the control messages transmitted by the base station to the wireless communication device is the Neighbor List Message, which contains configuration information to speed handoff to surrounding base stations.

An example of one such neighbor list message is the "Extended Neighbor List Message" of J-STD-008. When the base station sends an Extended Neighbor List Message to the mobile station, it uses the format of Table I.

TABLE I

| Field | Length (bits) |
|---|---|
| MSG_TYPE ('00001110') | 8 |
| PILOT_PN | 9 |
| CONFIG_MSG_SEQ | 6 |
| PILOT_INC | 4 |
| Zero or more occurrences of the following record: | |
| NGHBR_CONFIG | 3 |
| NGHBR_PN | 9 |
| SEARCH_PRIORITY | 2 |
| FREQ_INCL | 1 |
| NGHBR_BAND | 0 or 5 |
| NGHBR_FREQ | 0 or 11 |
| RESERVED | 0–7 (as needed) |

The above table is taken from Section 3.7.2.3.2.14 of J-STD-008, and indicates the various fields transmitted in an exemplary Extended Neighbor List Message. Of particular concern to the present invention is the NGHBR_CONFIG field. The base station includes one occurrence of the NGHBR_CONFIG record for each neighboring base station. In J-STD-008, the value of the NGHBR_CONFIG field is set according to the following table:

TABLE II

| Value (binary) | Neighbor Configuration |
| --- | --- |
| 000 | The neighbor base station has the same number of frequencies having paging channels as the current base station and has a CDMA frequency assignment corresponding to this CDMA frequency assignment with the same number of paging channels. |
| 001 | The neighbor base station has the same number of frequencies having paging channels as the current base station and has a CDMA frequency assignment corresponding to this CDMA frequency assignment with a different number of paging channels. |
| 010 | The neighbor base station may have a different number of frequencies having paging channels as the current base station. |
| 011 | The neighbor base station configuration is unknown. |

In simple terms, the value "000" indicates that the neighboring base station has the same configuration as the current base station. The value "001" indicates that the neighboring base station has the same configuration as the current base station except that it has a different number of paging channels. The value "010" indicates that the neighboring base station has a different number of CDMA frequency assignments and may have a different number of paging channels. The value "011" indicates that the neighbor has an unknown configuration.

Thus, according to J-STD-008 and IS-95, the mobile station is given an indication of whether the neighboring base station is on the same frequency assignment and has the same number or a different number of paging channels. This gives the mobile station enough information to begin the process of demodulating the neighboring base station's paging channel immediately upon acquiring its pilot channel, rather than having to wait for further information. For example, the mobile station may keep a table of all the neighbors that were passed to it in the neighbor list message or extended neighbor list message, plus all of the neighbors that it detected during its own independent searching. Such a table might include entries similar to Table III below. It should be noted that Table III is merely exemplary, and other neighbor lists may contain more or different fields representing other parameters of the neighboring base stations. The first column, "Reference", is provided merely for convenience in referring to the rows and may not be present in the wireless communication device.

TABLE III

| Reference | PN Offset (chips) | Frequency | NGHBR_CONFIG |
| --- | --- | --- | --- |
| A | 12 | f(1) | 000 |
| B | 24 | f(1) | 001 |
| C | 48 | f(1) | 000 |
| D | 12 | f(2) | 010 |
| E | 24 | f(2) | 011 |

This table is accessed by the wireless communication device when it needs to perform an idle handoff as a result of the neighboring base station's (the "target" base station's) pilot signal strength exceeding the current base station's pilot signal strength by a predetermined amount. An "idle handoff" is a handoff that occurs when the wireless communication device is in "idle" mode, monitoring its assigned paging channel, and not involved in an active call. Handoffs are discussed in more detail in the above-referenced U.S. Pat. No. 5,101,501.

The information retrieved from the neighbor list table helps speed up the idle handoff process. However, both IS-95 section 6.6.2.1.4 and J-STD-008 section 2.6.2.1.4 require that if the neighboring base station is not listed in the Neighbor List Message (of IS-95) or Extended Neighbor List Message (of J-STD-008) of the current base station, the wireless communication device shall perform the idle handoff operation using the same procedure as for a pilot in the list with the NGHBR_CONFIG field set to "011". In other words, when handing off to a target base station which was not reported to the wireless communication device by the current base station, the wireless communication device must treat the target base station as being of "unknown" configuration.

If the configuration of the target base station is unknown, the wireless communication device must restart an extensive re-acquisition process, disregarding most or all of its prior knowledge of the frequency assignment, pilot channel, and paging channels of the target base station. Such an extensive re-acquisition will be referred to herein as a "full re-acquisition." Since the time for a full re-acquisition may be on the order of several seconds, this can negatively affect the performance of the wireless communication device if the wireless communication device is busy re-acquiring the target base station rather than monitoring its paging channel for incoming control messages or pages. Under dynamic conditions where there are many base stations in a small geographical area, or where the wireless communication device is traveling quickly between coverage areas of neighboring base stations, the wireless communication device must perform many idle handoffs quickly in order to maintain adequate monitoring of its assigned paging channel and avoid missing incoming pages.

For example, consider the situation where the wireless communication device has acquired a first system, and has received an Extended Neighbor List Message for that system. In response to the Extended Neighbor List Message received, the wireless communication device may build a neighbor list similar to that of TABLE III, containing system parameter information for each neighboring base station (referenced, for convenience, as base stations A–E) listed in the Extended Neighbor List Message. Suppose the wireless communication device then detects the pilot signal of one of the base stations in the neighbor list, for example, base station B. When the received pilot signal strength of base station B becomes sufficiently stronger than that of the current base station, the wireless communication device will execute an idle handoff to base station B. Then, if the wireless communication device suddenly detects a sufficiently strong pilot signal of base station C, it will immediately execute a subsequent idle handoff to base station C. In a rapidly changing environment, this handoff may occur before the wireless communication device receives an Extended Neighbor List Message from base station B.

If no Extended Neighbor List Message has been received from base station B, then the wireless communication device would have to perform a full re-acquisition of base station C based on the rule as stated above that hen handing off to a target base station which was not reported to the wireless communication device by the current base station, the wireless communication device must treat the target base station as being of "unknown" configuration. In this example, the current base station, B, was unable to report the presence of base station C to the wireless communication device because of the short time that the wireless communication device was monitoring base station B's pilot channel. As such, the wireless communication device was required to treat base station C as being of "unknown" configuration, and perform a full re-acquisition of base station C. This may often be the case in a dynamically changing environment where back-to-back idle handoffs occur quickly.

Clearly, it would be advantageous for the wireless communication device to avoid having to perform a lengthy re-acquisition, and instead spend its time monitoring its assigned paging channel for incoming pages.

If the wireless communication device is in an environment where many back-to-back idle handoffs are occurring quickly, it may miss incoming pages due to the large percentage of time it spends performing full re-acquisition of the target base station rather than monitoring the paging channel.

SUMMARY OF THE INVENTION

The present invention is a novel and improved method and apparatus for constructing a temporary list of neighboring base station parameters in a wireless communication device. In the preferred embodiment, the wireless communication device receives a neighbor list message from a first base station The neighbor list message includes a respective base station configuration parameter for each of a plurality of base stations. The-neighbor list message may be, for example, the Neighbor List Message of IS-95 or the Extended Neighbor List Message of J-STD-008. In response to the neighbor list message, the wireless communication device constructs a neighbor list table, including one record for each of the plurality of base stations, with each record including their respective base station configuration parameter, similar to TABLE III above.

Among the plurality of base stations in the neighbor list message is a second base station, to which the wireless communication device will handoff. After handing off to the second base station, the wireless communication device replaces the record for the second base station with a corresponding record for the first base station. The wireless communication device then may change the respective base station configuration parameter for at least one of the records of the plurality of base stations in the neighbor list table. Specifically, the wireless communication device may change the respective base station configuration parameter for other records in the neighbor list table to match the base station configuration parameter of the second base station. In this manner, the wireless communication device constructs a temporary neighbor list table which closely approximates the neighbor list table that would have been built in response to a neighbor list message from the second base station, had it been received.

In the preferred embodiment, the base station configuration parameter has at least three possible values, a first value representing that a corresponding one of the plurality of base stations has a same configuration as said first base station, a second value representing that the corresponding one of the plurality of base stations has a different number of paging channels than the first base station, and a third value representing that the corresponding one of the plurality of base stations has a different number of frequency assignments than said first base station. This may correspond, for example, to the NGHBR_CONFIG values of "000", "001", and "010", respectively, as described above.

In order to properly "translate" the base station configuration parameters to match what would be expected from the second base station's neighbor list, the wireless communication device changes the existing base station parameter from the first value to the second value if the base station configuration parameter of the second base station is equal to the second value, and changes the base station configuration parameter from the first value or the second value to the third value if the base station configuration parameter of the second base station is equal to the third value.

The result of this replacement and translation of records in the existing neighbor list table is that a temporary neighbor list table is built which is similar to that which would be expected from the second base station, even though the Neighbor List Message from the second base station has not been received. In this way the present invention advantageously provides for the wireless communication device to avoid having to perform a lengthy re-acquisition, and instead allows it to spend its time monitoring its assigned paging channel for incoming pages. This is particularly advantageous when the wireless communication device is in an environment where many back-to-back idle handoffs are occurring quickly.

The present invention also includes an apparatus for implementing the method.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 2A and 2B are a block diagram of the method of the present invention.

DETAILED DESCRIPTION OF THE PREFERRED EMBODIMENTS

Figure 1:
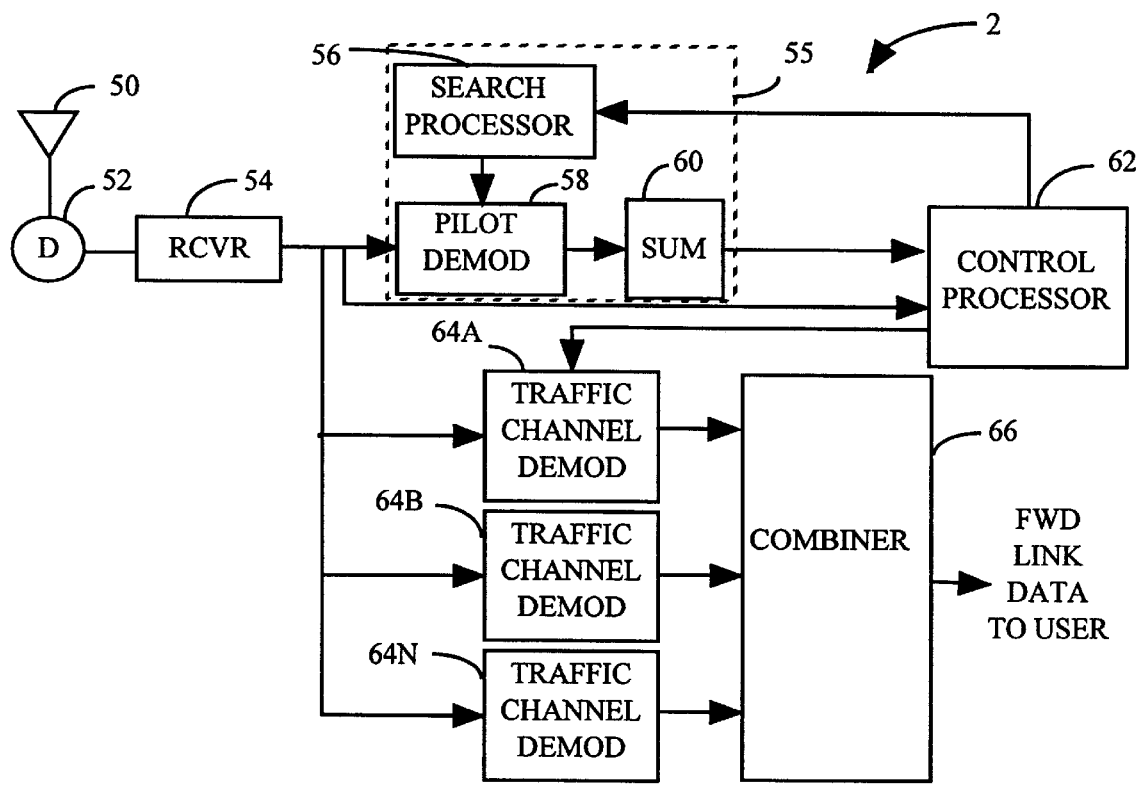
FIG. 1 is a block diagram of the apparatus of the present invention.

FIG. 1 illustrates the wireless communication device 2, which is also referred to herein as mobile station 2 of the present invention. Mobile station 2 continuously or at intermittent intervals measures the strength of pilot signals of neighboring base stations. Signals received by antenna 50 of mobile station 2 are provided through duplexer 52 to receiver (RCVR) 54 which amplifies, downconverts, and filters the received signal and provides it to pilot demodulator 58 of searcher subsystem 55.

In addition, the received signal is provided to traffic demodulators 64A–64N. Traffic demodulators 64A–64N, or a subset thereof, separately demodulate signals received by mobile station 2. The demodulated signals from traffic demodulators 64A–64N are provided to combiner 66 which combines the demodulated data, which in turn provides an improved estimate of the transmitted data.

Mobile station 2 measures the strength of pilot channels. Control processor 62 provides acquisition parameters to search processor 56. Specifically, control processor 62 provides such acquisition parameters to execute the method described below with reference to FIGS. 2A AND 2B. Control processor 62 builds a Neighbor List Table (not shown in FIG. 1) similar to Table III above from the Neighbor List Message or Extended Neighbor List Message sent by the base station and described above in Tables I and II. Control processor 62 then accesses the neighbor list table to provide acquisition parameters for neighbor acquisitions to be executed by searcher subsystem 55. Control processor 62 may be a conventional microprocessor as is known in the art, and associated memory. In the exemplary embodiment of a CDMA communication system, control processor 62 provides a PN offset to search processor 56 in accordance with the PN offset of the neighbor pilot signal to be acquired. Search processor 56 generates a PN sequence which is used by pilot demodulator 58 to despread the received signal. The despread pilot signal is provided to energy accumulator 60 which measures the energy of the demodulated pilot signal, by accumulating the energy for predetermined lengths of time as is known in the art.

The measured pilot energy values are provided to control processor 62. In the exemplary embodiment, control processor 62 compares the energy values to that of the current base station's pilot signal. If the measured pilot energy value of one of the neighboring base station's pilot signals exceeds that of the current base station's pilot signal by a predetermined amount, then the mobile station 2 executes a handoff to the neighboring base station in accordance with the techniques described in the above mentioned U.S. Pat. No. 5,101,501.

It should be noted that in FIG. 1, only the receive signal path has been illustrated. The mobile station 2 of the present invention may also include a transmit path (not shown) for using in sending various messages to the base station. However, for clarity and simplicity, the transmit path has been omitted from FIG. 1 because it is not critical to the present invention.

Figure 2A:
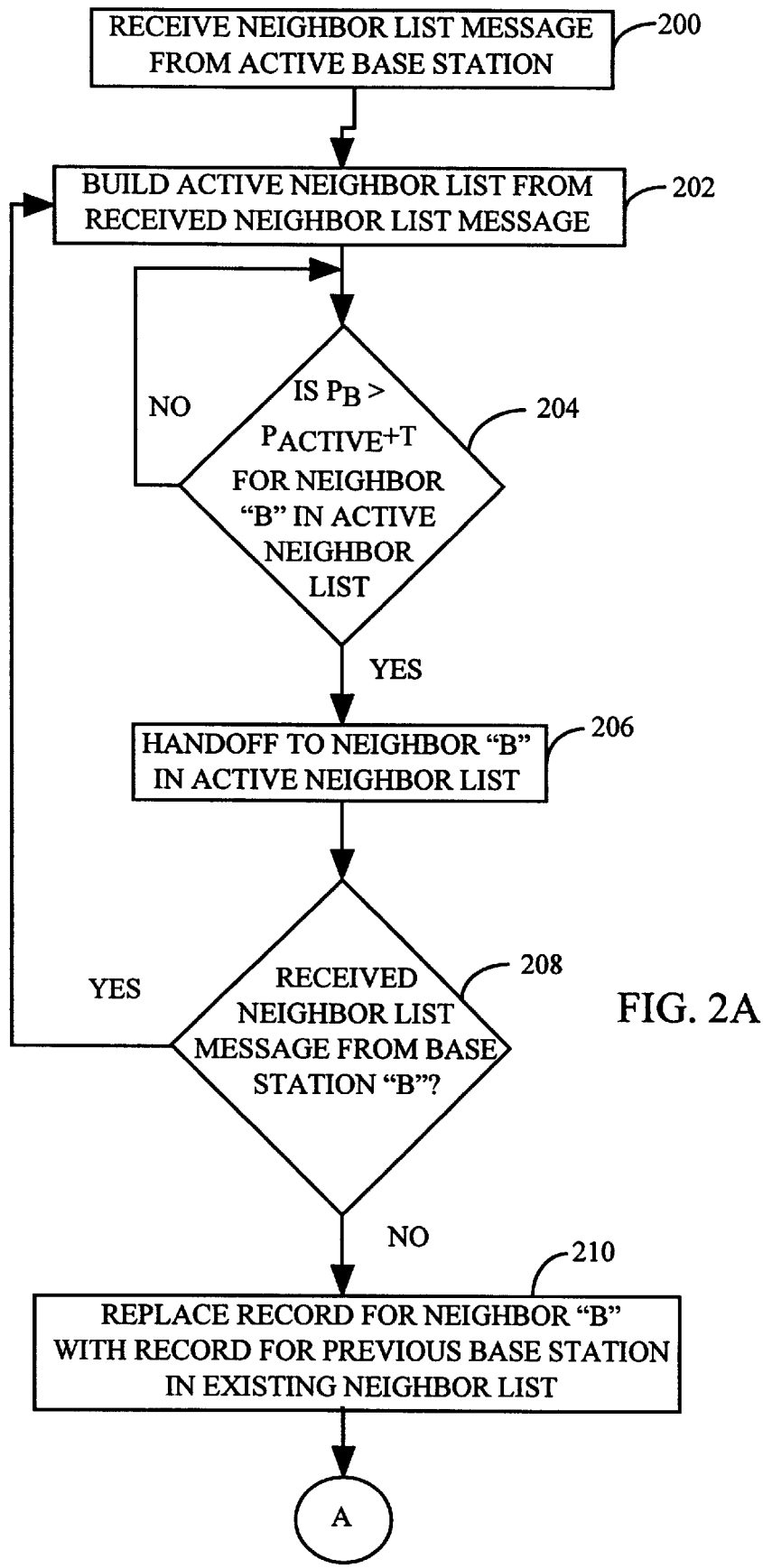

Referring now to FIG. 2A, a flowchart illustrating the method of the present invention is shown. The flow begins at block 200 with the mobile station 2 in Idle Mode, monitoring its assigned paging channel on the active base station, and receiving a Neighbor List Message or Extended Neighbor List Message from the active base station. In response to the received Neighbor List Message or Extended Neighbor List Message, the mobile Station 2 builds the active neighbor list table at block 202. The neighbor list table may be similar to that of TABLE III above. It should be noted that it is not critical to the present invention whether the mobile station is operating under IS-95 (in which case it receives a Neighbor List Message) or J-STD-088 (in which case it receives an Extended Neighbor List Message). The present invention is applicable to both standards. Thus, the term Neighbor List Message will be used herein to refer generically to both the IS-95 message and the J-STD-008 message.

At decision 204, the mobile station determines whether the received power, $P_B$ in dB, of the pilot signal of a neighboring base station "B" which is in the active neighbor list exceeds the received power, $P_{ACTIVE}$ in dB, of the pilot signal of the active base station by a predetermined threshold of T dB. If the received power, $P_B$, of base station B's pilot signal exceeds the received power, $P_{ACTIVE}$, of the active base station's pilot signal by T dB, then the flow moves to block 206 where the mobile station executes a handoff to the neighboring base station "B" as is known in the art and described in the above-referenced patents.

If, however, the received power, $P_B$, of base station B's pilot signal does not exceed the received power, $P_{ACTIVE}$, of the active base station's pilot signal by the predetermined threshold T, then the flow returns to decision 204 and the mobile station remains in communication with the active base station.

At decision 208, the mobile station determines whether it has yet received a neighbor list message from the new base station B. If it has, the flow returns to block 202 where the mobile station builds the active neighbor list from the Neighbor List Message received from base station B, as the new active base station.

If, however, the mobile station has not yet received a Neighbor List Message from base station B, the mobile station begins the construction of a temporary neighbor list at block 210 by replacing the record for base station B in the existing neighbor list (the neighbor list built in block 202) with a record for the previous base station (the base station that the mobile station just executed a handoff from in block 206). In other words, the mobile station substitutes the previous base station for base station B in the existing neighbor list. This is intuitively reasonable since if base station B is present in the previous base station's Neighbor List Message, then the previous base station should be present in base station B's Neighbor List Message. Thus, using the example of TABLE III above, the record for base station B, including the PN offset, frequency, and NGHBR__CONFIG, would be replaced by a corresponding record for the previous base station using the previous base station's PN offset, frequency, and NGHBR__CONFIG.

The flow continues to FIG. 2B. The steps of FIG. 2B may be referred to generally as "translating" the NGHBR__CONFIG values for the remaining records in the neighbor list table to correspond to the values that would be expected in base station B's own Neighbor List Message had it been received.

In decision 212 of FIG. 2B the mobile station determines whether the value of NGHBR__CONFIG for base station B in the previous base station's Neighbor List Message is equal to "000". If it is, then the process ends at block 214 with no further changes to the neighbor list table required. In such a case, no further changes are required to the neighbor list table because a NGHBR__CONFIG value of "000" for base station B in the previous base station's Neighbor List Message means that base station B and the previous base station have the same configuration. Thus, by merely substituting the previous base station for base station B in the existing neighbor list table, a temporary neighbor list table is constructed for base station B that simulates the neighbor list table that would have been built from base station B's own Neighbor List Message, had it been received. This will improve the likelihood that a full re-acquisition will not be necessary if a subsequent handoff to a different base station is immediately required.

However, if the value of NGHBR__CONFIG for base station B in the previous base station's Neighbor List Message is not equal to "000", the flow continues to decision 216 where the mobile station determines whether the value of NGHBR__CONFIG for base station B in the previous base station's Neighbor List Message is equal to "001". If it is, then the mobile station further alters the existing neighbor list table at block 218 by changing the NGHBR__CONFIG field to "001" for all records which have a NGHBR__CONFIG entry of "000". This is proper because if a base station, for example base station "C", in the existing neighbor list table has the same configuration (NGHBR__CONFIG="000") as the previous base station, but base station B has a different number of paging channels (NGHBR__CONFIG="001") than the previous base station, then base station B will also have a different number of paging channels than base station This corresponds to the example of TABLE III above. Since base station "B" of TABLE III has a NGHBR_CONFIG value of "001", it has a different number of paging channels than the previous base station. In this case, after replacing the record for base station B with a corresponding record for the previous base station in block 210, the mobile station would change the NGHBR_CONFIG values for the records for base stations A and C to "001" from their present value of "000". This process may be generally referred to as "translating" the NGHBR_CONFIG values to what they would be expected to be in base station B's own Neighbor List Message, had it been received.

However, if the value of NGHBR_CONFIG for base station B in the previous base station's Neighbor List Message is not equal to "001", the flow continues to decision 220 where the mobile station determines whether the value of NGHBR_CONFIG for base station B in the previous base station's Neighbor List Message is equal to "010". If it is, then the mobile station further alters the existing neighbor list at block 222 by changing the NGHBR_CONFIG field to "010" for all records which have a NGHBR_CONFIG entry of "000" or "001". This is proper because if a base station, for example base station "D", in the existing neighbor list table has a different number of frequency assignments than the previous base station, it would also have a different number of frequency assignments than any other base station which has the same number of frequency assignments as the previous base station (i.e. those with a NGHBR_CONFIG of "000" or "001").

Finally, if the value of NGHBR_CONFIG for base station B in the previous base station's Neighbor List Message is not equal to "010", the flow ends at block 214 because the value of NGHBR_CONFIG for base station B must then be "011", corresponding to an unknown configuration. In such a case, there would be no advantage to translating the NGHBR_CONFIG fields for the remaining neighbor list table records because they would all be "unknown" with respect to base station B, resulting in a full re-acquisition anyway.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for constructing a temporary list of neighboring base station parameters in a wireless communication device, the method comprising the steps of:

receiving a neighbor list message from a first base station, said neighbor list message including a respective base station configuration parameter for each of a plurality of base stations, said plurality of base stations including a second base station;

constructing a neighbor list table in response to said neighbor list message, said neighbor list table including one record for each of said plurality of base stations, each record including said respective base station configuration parameter;

determining whether a second neighbor list message has been received from said second base station; and replacing said record for said second base station with a corresponding record for said first base station if said second neighbor list message is not received from said second base station.

2. The method of claim 1 further comprising the step of changing said respective base station configuration parameter for at least one of said records of said plurality of base stations.

3. The method of claim 2 wherein the step of changing said respective base station configuration parameter for said at least one of said records of said plurality of base stations comprises changing said respective base station configuration parameter to match the base station configuration parameter of said second base station.

4. The method of claim 3 wherein said base station configuration parameter has at least three possible values, a first value representing that a corresponding one of said plurality of base stations has a same configuration as said first base station, a second value representing that said corresponding one of said plurality of base stations has a different number of paging channels than said first base station, and a third value representing that said corresponding one of said plurality of base stations has a different number of frequency assignments than said first base station, said step of changing said respective base station configuration parameter for said at least one of said records of said plurality of base stations further comprising the steps of:

changing said base station configuration parameter from said first value to said second value if said base station configuration parameter of said second base station is equal to said second value; and changing said base station configuration parameter from said first value or said second value to said third value if said base station configuration parameter of said second base station is equal to said third value.

5. A circuit for constructing a temporary list of neighboring base station parameters in a wireless communication device, the circuit comprising:

a receiver for receiving a neighbor list message from a first base station, said neighbor list message including a respective base station configuration parameter for each of a plurality of base stations, said plurality of base stations including a second base station; and a control processor, coupled to said receiver, for constructing a neighbor list table in response to said neighbor list message, said neighbor list table including one record for each of said plurality of base stations, each record including said respective base station configuration parameter;

said control processor further for determining whether said receiver has received a second neighbor list message from said second base station and for replacing said record for said second base station with a corresponding record for said first base station after determining that said receiver did not receive said second neighbor list message from said second base station.

6. The circuit of claim 5 wherein said control processor is further for changing said respective base station configuration parameter for at least one of said records of said plurality of base stations.

7. The circuit of claim 6 wherein said control processor changes said respective base station configuration parameter to match the base station configuration parameter of said second base station.

8. The circuit of claim 7 wherein said base station configuration parameter has at least three possible values, a first value representing that a corresponding one of said plurality of base stations has a same configuration as said first base station, a second value representing that said corresponding one of said plurality of base stations has a different number of paging channels than said first base station, and a third value representing that said corresponding one of said plurality of base stations has a different number of frequency assignments than said first base station, and wherein said control processor:

changes said base station configuration parameter from said first value to said second value if said base station configuration parameter of said second base station is equal to said second value; and changes said base station configuration parameter from said first value or said second value to said third value if said base station configuration parameter of said second base station is equal to said third value.

* * * * *